Oct. 19, 1965   J. E. TAYLOR   3,213,292
VARIABLE ADMITTANCE SWITCHING DEVICE
Filed April 21, 1961   2 Sheets-Sheet 2

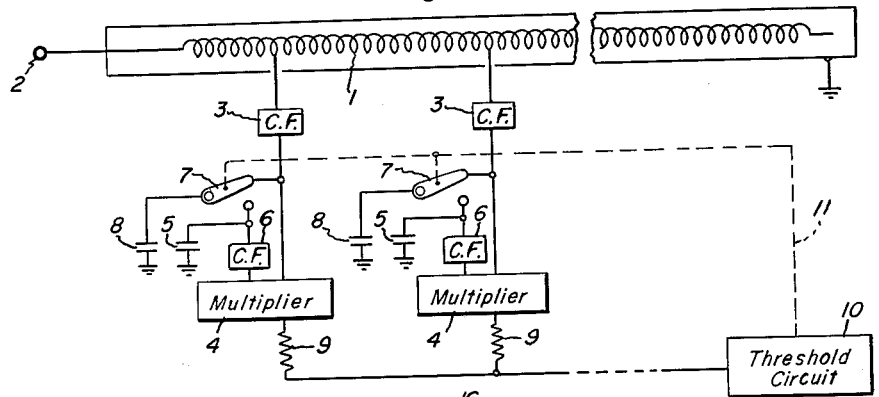
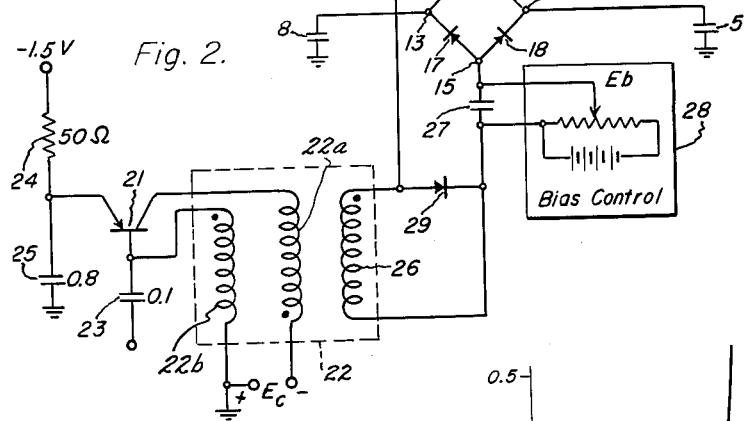
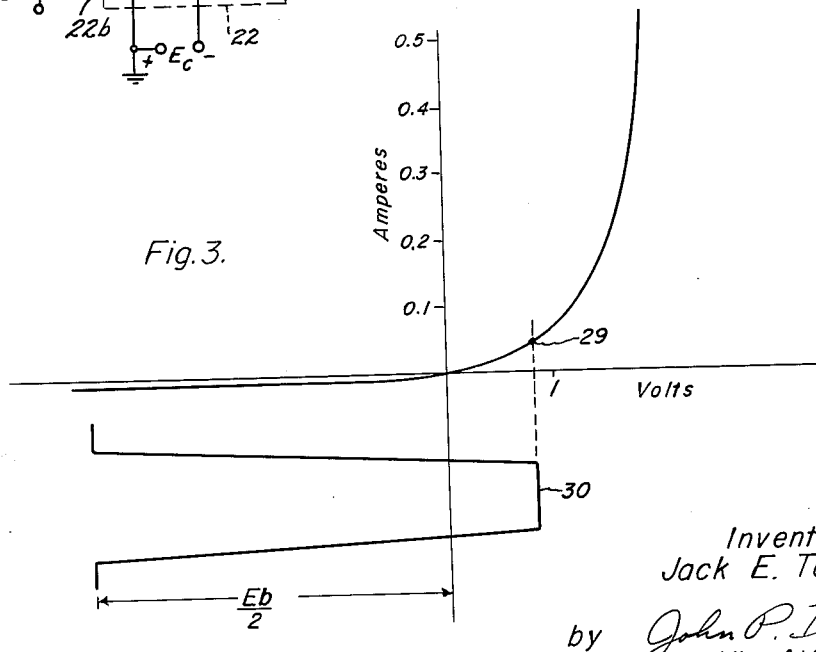
Inventor:
Jack E. Taylor,
by John P. Dellitt
His Attorney.

Inventor:
Jack E. Taylor,
by John P. Dellett
His Attorney.

United States Patent Office 3,213,292
Patented Oct. 19, 1965

3,213,292
VARIABLE ADMITTANCE SWITCHING DEVICE
Jack E. Taylor, Schenectady, N.Y., assignor to General
Electric Company, a corporation of New York
Filed Apr. 21, 1961, Ser. No. 104,646
15 Claims. (Cl. 307—88.5)

This invention relates to an electrically controllable weighted average switching circuit and particularly to such a circuit whose admittance when conducting is electrically controllable.

In electronic equipment of the learning or adaptive type it has become desirable to couple an input signal into a storage device in a manner such that the influence a particular signal has upon a stored value may be determined, that is, whereby a sampled signal is weighted before being stored. For example, in the copending application of Charles V. Jakowatz, for an Adaptive Filter, Serial Number 7,276, filed February 8, 1960, now Patent No. 3,114,884 and assigned to the same assignee as the present invention, an apparatus is disclosed wherein an incoming signal is coupled to local storage at such times as the incoming signal compares favorably with a value in the local storage. In this manner, there can be accumulated in local storage an increasingly valid representation of a previously unknown signal, such as one buried in background noise, as this signal successively repeats. However, the incoming signal can change in shape, time, etc., in the manner a radar return from a moving target changes, whereupon the representation of the incoming signal in local storage should also change. Therefore a weighted averaging system, for inserting input into storage, is preferred wherein the most recent occurrence of the input signal is given more weight or influence in local storage than past occurrences of the signal. This feature may be termed "forgetting."

In the previously referred to copending application of Charles V. Jakowatz the weighted averaging is accomplished by employing a plurality of sampling capacitors coupled to an input, each having a voltage thereacross corresponding to an increment of input, and also a plurality of corresponding local storage capacitors. When the correlation between the values on sampling capacitors and the values on the local storage capacitors exceeds a predetermined threshold, indicating similarity, corresponding sampling and local storage capacitors are connected together to establish a charge equilibrium therebetween. As pointed out in the copending application of Charles V. Jakowatz, the weight given to each sample can be represented by the quantity $$\left(\frac{n}{n+1}\right)^k$$

where $n$ is the ratio of capacities of the local storage and sampling capacitor, while $k$ is the number of times information is inserted into the storage. The result is a weighted averaging process whereby the value in local storage is always more representative of recently applied signals than of signals less recently applied. One drawback of this arrangement lies in the fact that the weighting is adjustable by means of varying the ratio, $n$, the size of the storage capacitor to that of the sampling capacitor.

In practice where circuits using large numbers of capacitors are employed and where the values of such capacitors are greater than those conveniently available in variable form, it is inconvenient to thus alter the weighting of the weighted averaging process during operation of the adaptive filter, or otherwise. Such a change in the weighting averaging process is desirable, however. For example, it may be desirable to change the weighting which signals for combination with storage may receive as a function of the degree of correlation between the incoming signal and the stored value. In this manner, as storage becomes a better and better representation of the previously unknown signal (which appears not to change) the process of combining new occurrences thereof with storage may become more nearly a straight averaging process so that extraneous noise has less opportunity to enter storage.

It is therefore an object of the present invention to provide improved arithmetic weighting for entering input sampled material into storage.

In accordance with the illustrated embodiment of the present invention, a diode bridge or ring switch is disposed between the sampling and storage circuits in the adaptive system. A bias voltage is applied across the control terminals of the ring switch which normally prevents the bridge elements from conducting. Control voltage switching pulses of the opposite polarity direction, in combination with the bias, act to cause adjustable conduction of the switching elements at a predetermined point on a non-linear forward impedance characteristic. The conduction of the bridge with a predetermined admittance for a predetermined time establishes, in conjunction with the storage element, the weighting given to a particular sample.

The subject matter which I regard as my invention is particularly pointed out and distinctly claimed in the concluding portion of this specification. The invention, however, both as to organization, and method of operation, together with further objects and advantages thereof, may best be understood by reference to the following description taken in connection with the accompanying drawings wherein like reference characters refer to like elements and in which:

FIG. 1 is a simplified schematic diagram of a learning system known as an adaptive filter;

FIG. 2 is a schematic diagram of a variable admittance switching circuit in accordance with the present invention;

FIG. 3 is a characteristic curve of one of the unilateral impedance elements of the switching circuit according to the present invention;

Figure 4:
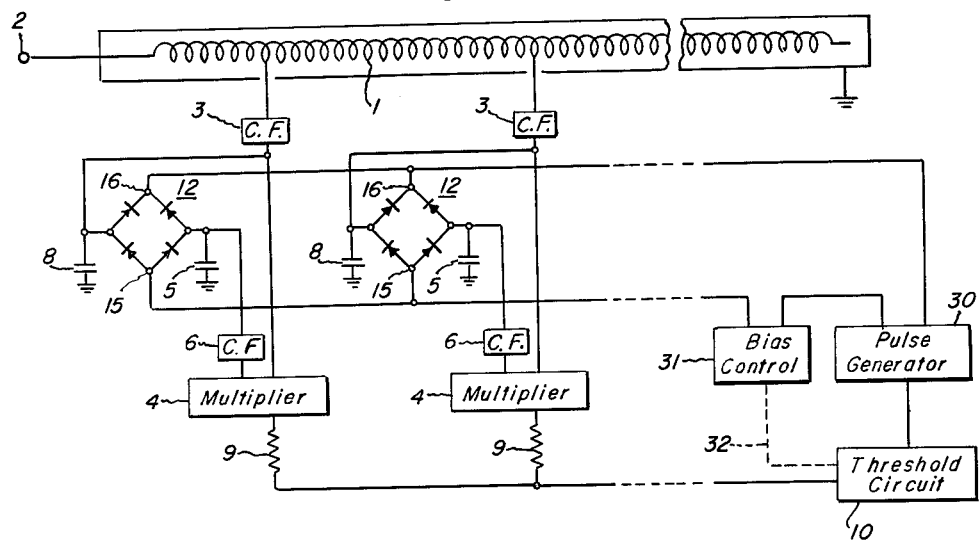
FIG. 4 is a schematic diagram wherein variable admittance switching circuits are employed as coupling elements in an adaptive filter system according to the present invention.

Referring to FIG. 1, an adaptive filter of the type disclosed and claimed in the aforementioned Jakowatz application includes a delay line 1, coupled to an input source at terminal 2. Cathode followers 3 tapped at spaced points along the delay line each provide one input for one of the multipliers 4 while the remaining input to each multiplier 4 is derived from a storage capacitor 5 through cathode follower 6. Single pole, double throw relay contacts 7 connect a sampling capacitor 8, alternatively to receive a delay line sample through cathode follower 3 in one switching position, and directly across storage capacitor 5 in the other switching position. The outputs of multipliers 4 are summed through a summing network consisting of resistors 9 and applied as the input to a threshold circuit 10 arranged to actuate relay contacts 7, as indicated by dashed line 11, when the sum of the multiplications reach a predetermined value.

As specifically disclosed in the aforementioned Jakowatz application, the sum applied to threshold circuit 10 approximates the cross correlation function between the elements of an input distributed along delay line 1 and corresponding stored signal elements on storage capacitors 5. When the cross correlation function reaches a predetermined threshold, a predetermined degree of comparison between the incoming and stored values has been attained, and therefore threshold circuit 10 acts to close relay contacts 7 from the upper position to the lower position thereby connecting the respective sampling and storage capacitors 8 and 5 together. The capacitor 8 voltage will approximately equal a sample voltage at the corresponding delay line tap. When the capacitors are connected together for a sufficient period of time, a charge equilibrium condition therebetween will be reached such that the stored value of voltage on storage capacitor 5 is influenced by the new sample value on sampling capacitor 8. Sampling capacitor 8 is thereupon reconnected to cathode follower 3 through relay contact 7 to reassume the sample voltage along the delay line. After a number of occurrences of a repetitive signal, a fairly accurate representation thereof will be achieved on storage capacitors 5, even though the signal is initially unknown and somewhat obscured by background noise. It is appreciated that further sampling taps together with corresponding sampling and storage capacitors occur along delay line 1, to the extent needed to define a particular signal.

Initially, since the incoming signal is unknown, the threshold established by threshold circuit 10 is set very low; however, as a better and better representation of the signal becomes stored on storage capacitors 5, the threshold level of threshold circuit 10 is raised in response thereto, so it will become increasingly likely that switch contacts 7 are actuated in response to the occurrence of the repetitive signal rather than noise. The manner of raising the threshold is set out in the said Jakowatz application.

Although the storage capacitors 5 form an increasingly valid representation of the input signal, it should be pointed out that the signal in storage should be able to, and is as a matter of fact, able to follow changes in form and relative time position of an input signal. It can be seen mathematically that the stored value on a storage capacitor 5 will be more nearly representative of the more recent samples from a storage capacitor 8 due to the interaction of capacitors 5 and 8 when connected together by switching contacts 7. The voltage S on a storage capacitor 5 after being connected to sampling capacitor 8 a total of $k$ times, and wherein the various voltages appearing on a sampling capacitor 8 have been $A_1, A_2 \ldots A_k$, is given by the following formula:

$$S = \frac{A_1}{n}\left(\frac{n}{n+1}\right)^k + \ldots \frac{A_{k-1}}{n}\left(\frac{n}{n+1}\right)^2 + A_k\left(\frac{n}{n+1}\right)$$

where $n$ is the capacity ratio of the capacitor 5 to capacitor 8. The quantity $$\left(\frac{n}{n+1}\right)$$

is a fraction and therefore $$\left(\frac{n}{n+1}\right)^k$$

is less than $$\left(\frac{n+1}{n}\right)$$

It is therefore seen that after $k$ number of closures of switching contact 7, the total amount S in storage is much more representative of the last sampled value $A_k$ than the first sampled value $A_1$. If switch contacts 7 closes a very large number of times such that $k$ approaches infinity it is apparent that the system would have completely "forgotten" the first value $A_1$ since $$\left(\frac{n}{n+1}\right)^k$$

would be zero. This desirable arithmetic switching function in favor of the more recently acquired samples enables the adaptive filter to follow changes in the signal appearing on delay line 1. For example, if the repetitive signal appearing on delay line 1 represents a radar return signal indicative of a moving target, the value of $n$, being the ratio of the capacitors, can be set such that the storage capacitors tend to change their stored values as the signal changes, as rapidly as is necessary. The value of $n$ must be balanced between a value permitting the utmost change, on the one hand wherein $n$ would be small, and a value of $n$ permitting the greatest fidelity in adapting to an unknown signal while disregarding noise, where $n$ would be large. Then for different applications $n$ may be required to assume different values and may even advantageously assume different values during the adaptation of the filter to a signal. For example, before the filter is to become locked on a signal, rapid recognition by the filter of an incoming signal may make it desirable that $n$ be small, while $n$ then would desirably be raised in value as confidence is gained in the signal in storage. Then individual samples would be given increasingly less weight in order to discount noise surrounding the signal.

Although the desirability of changing the switching in an adaptive filter as determined by the quantity $$\left(\frac{n}{n+1}\right)^k$$

has been pointed out, it is obviously quite awkward to conveniently and economically change the values of the capacitance ratio instantaneously and during operation. The present invention therefore contemplates an arrangement whereby the weighting of a sample signal put into storage is instantaneously and electrically adjustable in a practical manner.

Referring to FIG. 2 illustrating a circuit according to the invention, a variable admittance switching means is shown disposed between an individual sampling capacitor 8 and a storage capacitor 5 for the purpose of electrically and instantaneously varying the weighting or influence given to the voltage value from the sampling capacitor 8 as it is connected to storage capacitor 5 through the switching means. A diode bridge or ring switch 12 includes an input terminal 13, an output terminal 14 and first and second conjugate or control terminals 15 and 16, respectively. Diodes 17, 18, 19 and 20 form the four arms of the bridge, a diode being connected between the input and each of the control terminals, and also between the output and each of the control terminals. The diodes are poled such that all will carry a positive current from control terminal 15 to control terminal 16. That is, diodes 17 and 18 each have their anodes connected to terminal 15 while diodes 19 and 20 have their cathodes connected to control terminal 16. Input terminal 13 is coupled to capacitor 8 while output terminal 14 is coupled to capacitor 5.

The bridge is normally in a non-conducting condition. A triggered pulse generator, comprising a transistorized blocking oscillator, is employed to drive the control or conjugate terminals 15 and 16 of the bridge to allow communication between input and output terminals. In the blocking oscillator, as illustrated, a PNP transistor 21 has its collector connected to the negative terminal of a voltage source designated $E_c$ through one winding 22a of a three-winding transformer 22. A second winding 22b of the transformer, coupled for a positive feedback, drives the base electrode of the transistor in common with the output of a trigger coupling capacitor 23. The transistor emitter is joined to the midpoint of a resistor capacitor combination wherein the resistor 24 is interposed between a negative bias voltage and the transistor emitter while a capacitor 25 shunts the emitter to ground. A third winding or output winding 26 of transformer 22 has one side thereof connected to bridge control terminal 16, the other side thereof being coupled to bridge control terminal 15 through capacitor 27. A variable D.-C. bias control source 28, normally preventing bridge conduction, is disposed across capacitor 27 with its negative side connected to bridge control terminal 15. A clipping diode 29 is shunted across output winding 26.

The variable admittance switching device of FIG. 2 can best be explained with reference to FIG. 3 illustrating an impedance characteristic representative of any of the bridge diodes 17, 18, 19 or 20. In the FIG. 3 it can be seen that the forward impedance is much less than the back impedance of the diodes, wherein substantially no current flows through the diode for a substantial voltage thereacross. However the diodes have a non-linear forward impedance characteristic as illustrated in FIG. 3 where the current through the diode varies in a non-linear manner with voltage. The diodes should conveniently have a forward impedance variable from approximately 10 to approximately 1,000 ohms while having a back impedance greater than 50 megohms. The present invention operates by initiating conduction through the bridge from capacitor 8 to capacitor 5 for a predetermined time and a predetermined impedance level, represented by a particular point, for example, point 29 on the FIG. 3 forward impedance characteristic. The pulse 30 is illustrative of the output voltage of winding 26 of the pulse generator while voltage $E_{b/2}$ represents a particular setting $E_b$ for the variable D.-C. bias control 28.

Referring again to FIG. 2, a negative pulse applied to the base of transistor 21 through capacitor 23 initiates the switching operation of the apparatus. The transistor is normally cut off by the negative voltage provided through resistor 24 which has charged emitter capacitor 25 to relatively the same negative value. However, when a negative input pulse is applied through capacitor 23 which pulse voltage is in excess of the emitter bias voltage, the transistor conducts whereby the capacitor 25 charges toward the lower potential of the base through the emitter of transistor 21. The base current establishes a large collector current flowing through winding 22a of three-winding transformer 22. A second winding 22b is oriented such that it is excited to produce a larger negative voltage on the base of transistor 21 driving the transistor further into conduction. The process is cumulative until transformer 22 tends to saturate whereupon no greater flux change occurs therein for greater collector current flowing through the collector-connected winding of the transformer. At this time, the potential of the transformer's base connected coil rises above the more negative bias level which capacitor 25 has now assumed, whereupon the transistor rapidly ceases to conduct. This blocking-oscillator action produces a sharp pulse across output winding 26. A reverse polarity overshoot caused by flux reversal in the transformer is shunted by clipping diode 29. The main sharp pulse is applied across bridge terminals 15 and 16 through capacitor 27 to cause diodes 17, 18, 19 and 20 to conduct and pass a control current from control terminal 15 to control terminal 16 at an impedance level represented by point 29 in FIG. 3. Other impedance levels along the characteristic can be instantaneously chosen by altering the bias voltage, $E_b$, or $E_c$, the transistor collector supply voltage.

It should be noted that the entire circuit including output winding 26 and bridge circuit 12 "floats" with respect to ground so that the bridge can perform its switching function independent of actual values of voltage or impedance levels at the input and output terminals. The action of conduction across the bridge from input to output may be described as follows: During conduction by the bridge diodes a positive incremental current from capacitor 8 to capacitor 5 will tend to flow through diode 19, winding 26, capacitor 27 and diode 18 to capacitor 5. A "reverse" incremental current would flow through diode 17, capacitor 27, winding 26, and diode 20 to capacitor 5. The transformer winding 26 acts as a constant voltage source.

In accordance with the present invention the admittance of the bridge circuit containing capacitor 8 and capacitor 5 is adjustable either in accordance with the variable voltage $E_b$ of bias control source 28, or in accordance with the voltage $E_c$, the collector voltage of the transistor blocking oscillator pulse generator. Either of these voltages can be employed to control the point 29 on the diode impedance characteristics (FIG. 3) to determine the admittance between terminals 13 and 14 of the bridge. Adjustment of the control voltage $E_c$ adjusts the height of the pulse 30 (FIG. 3). However, in many instances it is more convenient to control the D.-C. bias control voltage $E_b$, proportional to the difference between the base of the pulse 30 in FIG. 3 and the zero voltage point. This voltage, $E_b$, derived from variable D.-C. bias control source 28 is opposed in potential to the pulse output of winding 26 of the pulse generator so will determine the net potential across the bridge diodes when the pulse is present. Adjustment of the value of $E_b$ therefore adjusts the value of forward admittance across the bridge from terminal 13 to terminal 14 and therefore adjusts the weighting or influence which the voltage on sampling capacitor 8 has upon the value stored on storage capacitor 5.

It is noted that since the impedance characteristic shown in FIG. 3 is for one diode, the bias value indicated is approximately $E_{b/2}$, while the pulse derived from the output winding 26 of transformer 22 will actually be twice the height of pulse 30 in FIG. 3.

As previously noted, the switching apparatus is normally open, that is nomally cut off. In the absence of a switching pulse from the pulse generator, the D.-C. bias control voltage from source 28 is applied across the control terminals of the bridge through winding 26 such that a positive potential appears on control terminal 16 with respect to control terminal 15. The voltage from D.-C. bias control source 28 should not be less than the voltage swing of the input voltage applied to bridge terminal 13. Thus in one particular apparatus employing the present device, where the input voltage swing on sampling capacitor 8 equalled approximately 5 volts, D.-C. bias control source 28 was constrained to not become less than 6 volts, so that the voltage appearing across the bridge diodes remains in a back-biasing or non-conducting direction in the absence of a switching pulse from the pulse generator winding 26. The capacitor 27 by-passes the D.-C. bias control source 28 for switching pulses produced from output winding 26. At the conclusion of such a switching pulse any remaining voltage on capacitor 27 actually is in a direction aiding the bias control source 28.

Consideration will now be given to the manner in which weighted sampling is readily controllable according to the apparatus of the present invention. Mathematical consideration of the FIG. 2 circuit shows, that if $E_{a_j}$ is the voltage on storage capacitor 5 after the $j$th switching instance, due in part to a voltage $E_{s_j}$ on sampling capacitor 8 just before the switching instance, then $$E_{a_j} - E_{a_{j-1}} = (E_{s_j} - E_{a_{j-1}}) \left(\frac{C_8}{C_5 + C_8}\right)\left(1 - e^{-\frac{t_p(C_5+C_8)G_f}{C_5 C_8}}\right)$$

Thus, $$E_{a_j} = E_{a_{j-1}}\left[1 - \frac{C_8}{C_5+C_8}\left(1 - e^{-\frac{t_p(C_5+C_8)G_f}{C_5 C_8}}\right)\right]$$

$$+ E_{s_j}\frac{C_8}{C_5+C_8}\left(1 - e^{-\frac{t_p(C_5+C_8)G_f}{C_5 C_8}}\right)$$

where $C_5$ and $C_8$ are the capacitance values of capacitors 5 and 8, respectively, $G_f$ is the forward admittance of the switching device, and $t_p$ is the time period the switching device conducts in the forward direction.

Let $$\frac{C_8}{C_5+C_8}\left(1 - e^{-\frac{t_p(C_5+C_8)G_f}{C_5 C_8}}\right) = P$$

a weighting function between zero and one.

Then, $$E_{a_j} = E_{s_j}P + E_{a_{j-1}}(1-P)$$

In general, it can be shown that $$E_{a_j} = E_{s_j}P_j + E_{s_{j-1}}P_{j-1}(1-P_j) \\
+ E_{s_{j-2}}P_{j-2}(1-P_{j-1})(1-P_j) + \ldots \\
+ E_{s_1}P_1(1-P_2)(1-P_3) \ldots (1-P_j)$$

The same conclusion can be reached by somewhat simplified calculations. Assume storage capacitor 5 initially stores no charge, that is, its voltage equals zero volts. The voltage to which storage capacitor 5 charges can be approximated as $$E_{a_1} = \frac{E_{s_1}G_f t_p}{C_5}$$

where $E_{s_1}$ is the initial voltage across the sampling capacitor 8, $C_5$ is the capacitance of capacitor 5, $G_f$ is the forward admittance of the switching circuit, and $t_p$ is the time period the switching circuit is conducting.

Let $$\frac{G_f t_p}{C_5} = P$$

a weighting function.
Then, $$E_{a_1} = E_{s_1}P$$

P, the weighting function, is recognizable as a time constant of the form $$\frac{t}{RC}$$

Viewing the sampling capacitor 8, the storage capacitor 5, and the switching circuit in between as a series connection, the voltage on the storage capacitor 5 after two switching occurrences equals $$E_{a_2} = (E_{s_2} - E_{a_1})P + E_{a_1}$$

Then $$E_{a_2} = E_{s_2}P - E_{s_1}P(1-P)$$

and in general $$E_{a_j} = E_{s_j}P_j + E_{s_{j-1}}P_{j-1}(1-P_j) \\
+ E_{s_{j-2}}P_{j-2}(1-P_{j-1})(1-P_j) + \ldots \\
+ E_{s_1}P_1(1-P_2)(1-P_3) \ldots (1-P_j)$$

This series points up the fact that the influence of the last sampled signal voltage $E_{s_j}$ upon the accumulated stored voltage $E_{a_j}$ is greater than the influence of the first sampled signal voltage $E_{s_1}$, because $(1-P)$ is a fraction, and therefore $(1-P_2)(1-P_3) \ldots (1-P_j)$ is usually very small.

The weighting factor $(1-P)$ is a value less than 1 and is similar in its usefulness to the weighting factor $$\left(\frac{n}{n+1}\right)$$

described in connection with the FIG. 1 adaptive filter. That is, it may determine the "forgetting" of the apparatus, or the speed with which the filter is responsive to input signal changes. An important advantage is given however in employing the $(1-P)$ weighting factor, as described, in that P can be varied electrically in accordance with the apparatus of the present invention by varying the value of voltage $E_b$ or $E_c$. An adaptive filter including the variable admittance switching apparatus according to the present invention is illustrated in FIG. 4.

The apparatus of FIG. 4 is substantially the same in construction and operation as the FIG. 1 apparatus in respect to like portions and reference numerals, with the changes and additions hereinafter described. A number of variable admittance switching devices 12 according to the present invention are operable to controllably couple the various sampling capacitors 8 to the corresponding storage capacitors 5. The control terminals 15 and 16 of each variable admittance switching device are coupled in common to a pulse generator 30 of a type comparable to the blocking oscillator pulse generator illustrated in FIG. 2, which is in turn triggered by threshold circuit 10. When the correlation between input and stored signals exceeds the threshold value, the threshold circuit produces an output (as described in the aforementioned Jakowatz application). A negative threshold circuit output is used to trigger the pulse generator, for example through capacitor 23 in FIG. 2.

The variable admittance switching devices 12 are normally held in an open or non-conducting condition by means of a D.-C. bias control source 31 normally providing voltage of a polarity opposed to a polarity of pulses generated by pulse generator 30. However, when the cross-correlation circuitry comprising multipliers 4, adding resistors 9 and threshold circuit 10 indicate a high correlation between the input signal from terminal 2 and the stored signal version contained on capacitors 5, threshold circuit 10 triggers pulse generator 30 to produce a switching pulse applied to the various variable admittance switching devices 12. An important distinction, however, is that respective capacitors 5 and 8 are not brought into equilibrium as in the case of a relay contact connection, but rather a predetermined proportion of total possible charge exchange is permitted between the capacitors 8 and 5 in accordance with the control potentials applied to variable admittance switching devices 12. In a preferred embodiment of the invention as illustrated in FIG. 4, variable D.-C. bias control voltage from source 31 is adjustable for determining the value of the weighting function, $1-P$, and therefore for changing the weighting or influence individual sample voltages on capacitors 8 have on storage values contained on capacitors 5. Thus during the start of a signal recognition period it is frequently desirable for P to be large so that individual samples from sampling capacitors 8 will be weighted heavily. It is observable that if P is large, $1-P$ is small, and sample voltages received sampling back will have less influence in storage than if P were small. However as confidence is gained in the storage signal, P should desirably become smaller so that the signal in storage represents more of an average over a larger number of samplings, therefore more representative of a signal than its noise background.

In some instances the bias control source 31 may be placed under the control of threshold circuit 10 as indicated by the dashed line 32 in FIG. 4. The D.-C. bias control level is then changed in proportion to the threshold value in the threshold circuit, that is the value of the cross-correlation function which the sum of the signals from the multipliers must exceed before triggering pulse generator 30 to produce switching. As the threshold value of the cross-correlation function rises, the D.-C. voltage from bias control source 31 becomes more negative producing a lower value of P. However, the bias control voltage $E_b$ should not rapidly vary in response to changes in the threshold correlation, but should change in response to an integrated or averaged value thereof, preferably somewhat delayed, since the value of the correlation function may vary considerably from one switching operation to another.

Figure 5:
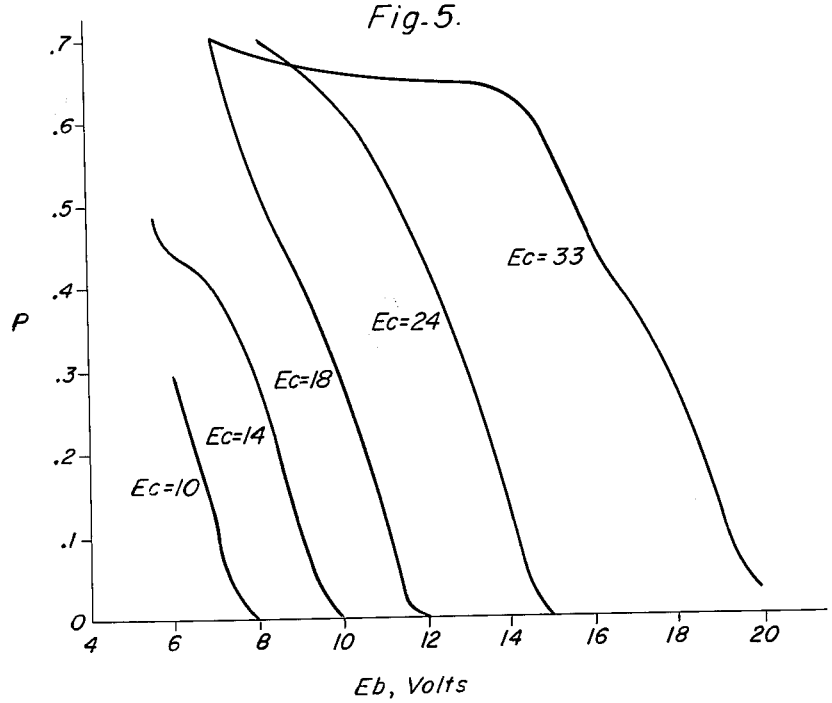
FIG. 5 is a plot of characteristics related to the admittance of the FIG. 2 circuit in an adaptive system as a function of the control voltages identified in FIG. 2.

The set of curves illustrated in FIG. 5 plot values of P vs. $E_b$ for different values of collector voltage $E_c$. Again, control of the variable admittance device according to the present invention can be achieved alternatively through variation of the collector potential $E_c$, if so desired.

It may also be noted that the value of P, and therefore the admittance of the switching devices can be varied by varying the time period, $t_p$, or pulse width produced from the pulse generator of FIG. 2. However, this time period is in general not a convenient variable in a typical pulse generator driving a heavy gating load, and it is therefore preferable according to the present invention to vary the supply or bias voltages described.

The adaptive filter connection, although quite advantageous, does not represent the only manner in which an arithmetic unit of the switching type according to the present invention can be effectively utilized. Consideration of the general expression for the unit $$E_{a_j} = E_{s_j}P_j + E_{s_{j-1}}P_{j-1}(1-P_j)$$
$$+ E_{s_{j-2}}P_{j-2}(1-P_{j-1})(1-P_j) + \ldots$$
$$+ E_{s_1}P_1(1-P_2)(1-P_3) \ldots (1-P_j)$$

illustrates utility as a digital to analog converter. If P is tion of the general expression for the unit, $$\frac{m}{m+1}$$

for a sequence of $j$ samples, then the above series can be rearranged to give:

$$\frac{m+1}{m}E_{a_j} = E_{s_j} + E_{s_{j-1}}\left(\frac{1}{m+1}\right) + E_{s_{j-2}}\left(\frac{1}{m+1}\right)^2$$
$$+ E_{s_1}\left(\frac{1}{m+1}\right)^{j-1}$$

The left side of this equation is the analog value of a quantity which is representable as a modulo $m+1$ digital number (on the right) of $j$ digits whose values are $E_{s_j}$, $E_{s_{j-1}} \ldots E_{s_1}$. The value $m=1$, for example, gives the well know $j$ digit binary digital to analog conversion.

In this instance, successive inputs (on capacitor 8) represent binary digits, starting from lower order, while the accumulated total in the output storage, e.g., capacitor 5, represents the analog voltage output. The ability to change P at will allows one circuit arrangement to act as a binary, ternary, etc., digital to analog converter. Furthermore, constant time separation of the digital pulses is not required as in the case of many digital to analog converters.

While I have shown and described various embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What is claimed is:

1. Apparatus for producing a weighted average of an electrical value derived from an input signal comprising input means for providing an input signal, an input signal storage circuit for receiving said input signal, an output accumulation circuit, means responsive to said input signal for intermittently coupling said input storage circuit to said accumulation circuit for establishing said weighted average in said accumulation circuit, and means for adjusting the relative consequence which samples from said input storage circuit receive in the accumulation including variably adjustable means for varying the admittance of said coupling means over a range of values when said coupling means is effective to couple said input circuit to said accumulation circuit.

2. The apparatus of claim 1 wherein the admittance of said coupling means varies in response to a degree of similarity between the electrical values in said signal storage circuit and said output accumulation circuit.

3. An electrically controllable variable impedance device comprising input means for providing an input signal, input signal storage means for receiving said input signal, output signal storage means, a diode ring switch providing a non-linear characteristic such that its conducting impedance is dependent upon the portion of the characteristic utilized, said input and output storage means being coupled in parallel with the respective input and output of said diode ring switch, means for establishing conduction in said ring switch for a predetermined period of time and a variable voltage level determining means for selecting the portion of the non-linear characteristic during conduction for altering the impedance between said input signal coupling means and said output signal coupling means over a range of values.

4. A variable switching device comprising input means for providing an input signal, an input storage means, an output storage means for receiving said input signal, bias voltage means, a ring switch between said input and said output storage means which is normally biased by said bias voltage means to present a substantial open circuit between said input and output storage means, said ring switch having said input and output storage means shunted across the input and output thereof and having a conducting impedance characteristic exhibiting a non-linear region, and variable voltage means for overcoming said bias means to establish conduction of said ring switch between said input and said output storage means at an impedance level corresponding to a selected point on the non-linear region of said characteristic.

5. A variable admittance device comprising input means for providing the input signal, an input storage means, an output storage means for receiving said input signal, a ring switch disposed between said terminals and also having control voltage terminals, said input and output storage means being disposed respectively in parallel with the input and output of said ring switch, the elements of said ring switch exhibiting a non-linear portion of forward admittance characteristic as a function of control voltage, a voltage biasing means coupled to said control voltage terminals for normally holding said ring switch in a non-conducting state as between said input and output storage means, a switching source providing switching pulses opposing said voltage biasing means at preselected times for rendering said ring switch conducting in the non-linear portion of said elements' forward admittance characteristic, and variably adjustable means for varying said voltage biasing means' opposition to said switching source and thereby to vary the forward admittance of said device between said storage means.

6. A variable admittance device comprising input means for providing an input signal; a bridge circuit having an input terminal for receiving said input signal, an output termnal, and first and second conjugate terminals; diodes poled in a first direction extending between a first conjugate terminal and the respective input and output terminals; diodes poled in the same direction extending between said input and output terminals and said second conjugate terminal; a point of common reference potential; a first storage capacitor coupled between said point and said input terminal; a second storage capacitor coupled between said point and said output terminal; pulse generator means connected between said conjugate terminals for generating a pulse to establish conduction across said bridge through said diodes between said conjugate terminals; and controllably variable direct current biasing means serially connected with said pulse generator means for establishing a voltage level across said diodes for establishing the admittance of said bridge circuit employing the non-linear portion of the characteristic of said diodes between said input and output terminals during conduction across said bridge.

7. The apparatus of claim 6 wherein said pulse generator means comprises a transistor; a three-winding transformer having an output winding coupled to the conjugate terminals of said bridge, having a winding connected in the collector circuit of said transistor, and having a feedback winding connected in the base circuit of said transistor; and an integrating capacitor connected in the emitter circuit of said transistor.

8. Apparatus for providing analog to digital conversion comprising input means providing successive and separate electrical values respectively representative of the digits of a digital number; a first storage device successively and separately receiving said electrical values from said input means respectively representative of the digits of said digital number; a second storage device for accumulating an analog value corresponding to said digital number, and non-linear switching means interposed between said storage devices for establishing communication therebetween at times when said first storage device stores said electrical values corresponding to the different digits, said first storage device and said second storage device being coupled respectively in shunt with the input and output of said switching means and variable means for controllably determining the degree of coupling admittance of said switching means between said storage devices during said communication.

9. The apparatus as set forth in claim 8 wherein said first and second storage devices comprise capacitors, wherein said switching means comprises a diode ring switch providing a non-linear characteristic such that its conducting admittance is dependent upon the portion of the characteristic utilized, and wherein the variable means for controllably determining the degree of coupling admittance comprises a voltage level determining means for selecting the non-linear characteristic portion utilized during conduction of the said ring switch.

10. In an adaptive system including sampling means, storage means, and comparison means for obtaining a correlation between values in said sampling and storage means and for establishing a threshold value of correlation beyond which a favorable comparison is indicated, a coupling means between said sampling and storage means which comprises a variable admittance switch closing in response to a favorable comparison registered by said comparison means and which is responsive in admittance to said threshold value.

11. The apparatus of claim 10 wherein the admittance of said variable admittance switch is reduced as said threshold value increases.

12. Apparatus for significant signal recognition comprising input means, means for storing a signal, means for comparing portions of input from said input means with said stored signal to determine the degree of correlation therebetween, coupling means for successively combining portions of said input with said stored signal as said correlation exceeds a threshold value for said stored signal to constitute a weighted average of portions of input successively combined therewith, said coupling means comprising a variable admittance switching device closing to combine a portion of input with said stored signal in response to the correlation reaching said threshold value, and means for electrically controlling the admittance of said switching device to change the weight a portion of input receives in said weighted average.

13. Apparatus for significant signal recognition comprising input means, means for storing a signal, means for comparing input from said input means with said stored signal to determine the degree of correlation therebetween, coupling means for successively combining portions of said input with said stored signal as said correlation exceeds a threshold value to constitute said stored signal a weighted average of portions of input successively combined therewith, said coupling means comprising a ring switch disposed between said input means and said means for storing a signal, the elements of said ring switch exhibiting a non linear portion of forward admittance characteristic as a function of control voltage, a voltage biasing means coupled to conjugate terminals of said ring switch for normally holding the elements thereof in a non-conducting state, a switching source providing switching pulses opposite said voltage biasing means at preselected times when said correlation reaches said threshold value for rendering said ring switch conducting in the non-linear portion of said elements' forward admitting characteristics, and adjustable means for varying said voltage biasing means in opposition to said switching source to vary the forward admittance of said ring switch between said input means and said means for storing a signal whereby to change the weight a portion of input receives in said weighted average.

14. Apparatus for significant signal recognition comprising input storage means, output storage means for storing a signal, means for comparing the value stored in said input storage means with the value stored in said output storage means, coupling means for successively combining portions of the value in said input storage means with the value in said output storage means as said correlation exceeds a threshold value in order to constitute the value on said output storage a weighted average of additions successively combined therewith from said input storage means, said coupling means comprising a variable admittance switching device including asymmetric conductor elements with a non-linear relationship between the voltage thereacross and the current therethrough, and means for determining the voltage across said asymmetric elements to change the weight an addition from said input storage means receives in said output storage means.

15. Apparatus for significant signal recognition comprising an input storage capacitor, an output storage capacitor, means for comparing the input and the output to determine the degree of correlation therebetween, coupling means having input and output terminals disposed between said input and output capacitors which coupling means is activated in response to a threshold degree of correlation for cooperating to produce on said output capacitor an average of values as appear on said input capacitor, said input and output capacitors being coupled in parallel with the input and output terminals of said coupling means, and means for electrically controlling the admittance of said coupling means to change the weight a voltage upon said input capacitor receives in the average value produced on said output capacitor.

References Cited by the Examiner

UNITED STATES PATENTS

| | | | |
|---|---|---|---|
| 2,098,370 | 11/37 | Bartels | 307—88.5 |
| 2,144,995 | 1/39 | Pulvermocher | 328—171 |
| 2,584,986 | 2/52 | Clark | 328—103 |
| 2,639,386 | 5/53 | Karpeles | 307—88.5 |
| 2,686,262 | 8/54 | Wiley | 328—67 X |
| 2,781,445 | 2/57 | Stocker | 328—121 |
| 2,829,251 | 4/58 | Patton | 328—132 |
| 2,845,547 | 7/58 | Althouse | 307—88.5 |
| 2,936,383 | 5/60 | Mees | 331—112 |
| 2,989,651 | 6/61 | Smith | 331—112 |

ARTHUR GAUSS, *Primary Examiner.*

HERMAN KARL SAALBACH, *Examiner.*